UNITED STATES PATENT OFFICE.

ERNEST L. RANSOME, OF SAN FRANCISCO, CALIFORNIA.

PROCESS OF UTILIZING SPENT LIME FOR BRICKS AND TILES.

SPECIFICATION forming part of Letters Patent No. 257,239, dated May 2, 1882.

Application filed May 20, 1881. (No specimens.)

*To all whom it may concern:*

Be it known that I, ERNEST L. RANSOME, of the city and county of San Francisco, in the State of California, have invented an Improved Process of Utilizing Spent Lime for Bricks and Tiles; and I do hereby declare that the following is a full, clear, and exact description thereof.

Numerous attempts have been made to utilize spent or dead lime, and particularly the waste lime of gas-works and soap and other factories, for a useful purpose. This product, however, has not, so far as I am aware, been successfully utilized, and it is therefore thrown aside as waste.

My invention or discovery consists in converting this waste product into bricks, tiles, drain and water pipes, and other articles which are usually made of clay or cement, by simply grinding or pulverizing it and then subjecting it to pressure in molds of a suitable shape without other preliminary treatment. My experiments have demonstrated that the amount of pressure necessary to compress this product into bricks for ordinary use can be obtained by the use of any of the ordinary brick machinery in which mechanical power is used for producing the compression; but as a matter of course the greater the pressure the more perfect the union of the particles and the more solid will be the resulting brick.

My experiments have established the following facts regarding the amount of pressure required to consolidate the waste product into bricks and other articles. A pressure of twenty-five tons upon an ordinary brick four by eight will render it solid and firm, so that it can be handled and built into a wall or other structure within a short time. A less pressure will cause the particles to adhere; but the bricks in this case should be left to harden and become incorporated by chemical action before handling or using them. I do not advise a less pressure than twenty-five tons to the brick, or about one ton to the inch, as this amount of pressure can be readily obtained with ordinary machinery; but, as before stated, a very heavy pressure is preferable, as the greater the pressure the more compact and reliable the resulting brick, and for this reason I prefer to use such powerful presses as will give several hundred tons pressure to the brick. The free lime, which is always contained in this waste product in a greater or less proportion, is the chemical agent which hardens the brick after it has been subjected to the pressure in molds by being converted into a carbonate. Some of the waste lime above referred to contains a larger per cent. of this free or active lime than others, and as a matter of course the pressure necessary to be employed and the hardness of the bricks will vary accordingly.

In my treatment of this product I cart it from the works or factory in which it is produced and pass it through an ordinary pug-mill in order to reduce the large pieces and pulverize the large particles. I then fill it directly into molds of the desired shape and size and subject it to pressure in the molds, so as to condense and compact it into a brick or block, as above stated. As soon as the pressure has been taken off I remove the brick or block at once from the mold, and it is found to be thoroughly compacted and bound together, and in a very short time will be ready for use. A brick thus made will improve with age, and can be handled without fear of injuring it. Drain and water pipe can be made out of this material at a very small expense.

Having thus described my invention, what I claim, and desire to secure by Letters Patent, is—

A brick or tile composed of spent lime which is first pulverized and then subjected to heavy pressure in molds, substantially as described.

In testimony whereof I have hereunto set my hand.

ERNEST L. RANSOME.

Attest:
W. F. CLARK,
EDWD. E. OSBORN.